(12) United States Patent
La Ferla et al.

(10) Patent No.: US 10,280,046 B2
(45) Date of Patent: May 7, 2019

(54) MACHINE FOR AERIAL HANDLING OF LOADS

(71) Applicant: Idrojet Srl, Camporotondo Etneo (IT)

(72) Inventors: Danilo La Ferla, Santa Maria di Licodia (IT); Francesco Viglianti, Sant'Agata li Battiati (IT)

( * ) Notice: Subject to any disclaimer, the term of this patent is extended or adjusted under 35 U.S.C. 154(b) by 0 days.

(21) Appl. No.: 15/501,522

(22) PCT Filed: Aug. 6, 2014

(86) PCT No.: PCT/IT2014/000209
§ 371 (c)(1),
(2) Date: Feb. 3, 2017

(87) PCT Pub. No.: WO2016/020945
PCT Pub. Date: Feb. 11, 2016

(65) Prior Publication Data
US 2017/0233225 A1    Aug. 17, 2017

(51) Int. Cl.
*B23P 19/02* (2006.01)
*B66C 1/10* (2006.01)

(52) U.S. Cl.
CPC ............ *B66C 1/105* (2013.01); *B23P 19/024* (2013.01); *Y10T 29/53117* (2015.01)

(58) Field of Classification Search
CPC ... B66C 1/105; B23P 19/024; Y10T 29/53117
USPC ..... 294/67.21, 67.4, 67.5, 81.3, 81.4, 81.54; 29/726.5
See application file for complete search history.

(56) References Cited

U.S. PATENT DOCUMENTS

| | | | | |
|---|---|---|---|---|
| 3,239,077 A | * | 3/1966 | Huff ...................... | B23P 19/024 254/100 |
| 3,257,001 A | * | 6/1966 | Postlewaite ........... | B23P 19/024 254/100 |
| 3,762,755 A | * | 10/1973 | Saether ................... | B66C 1/105 294/67.21 |
| 4,053,062 A | * | 10/1977 | Travis .................... | B23D 19/02 254/105 |
| 4,227,854 A | * | 10/1980 | Coffey ................... | B23P 19/022 29/726.5 |
| 4,575,305 A | * | 3/1986 | Krajicek ............... | B23P 19/024 29/726.5 |
| 4,648,647 A | * | 3/1987 | Patton .................... | B66C 1/105 212/195 |

(Continued)

FOREIGN PATENT DOCUMENTS

EP    0701962 A1 *  3/1996 ............ B66C 1/105

*Primary Examiner* — Dean J Kramer

(57) ABSTRACT

The present invention provides a machine for the aerial handling of a load. The machine comprises a bearing slide, an aerial suspension device slidably mounted on the bearing slide, a coupling and dragging device for coupling and dragging the load on the bearing slide, an actuator for a longitudinal movement of the support plate along the bearing slide, so as to continuously balance possible oscillations due to weight shifting during load handling operations, and load supporting and stabilizing elements provided along the bearing slide. The aerial suspension device includes a support plate slidably mounted below the bearing slide, a support structure formed integral with the support plate and having an interior allowing a passage of the load, and a suspension element for suspending the machine to a lifting device.

10 Claims, 1 Drawing Sheet

(56) References Cited

U.S. PATENT DOCUMENTS 5,032,054 A * 7/1991 Krajicek ............... B23P 19/024
 29/726.5
8,317,455 B2 * 11/2012 Mizelmoe ............. B23P 19/024
 414/745.3

* cited by examiner

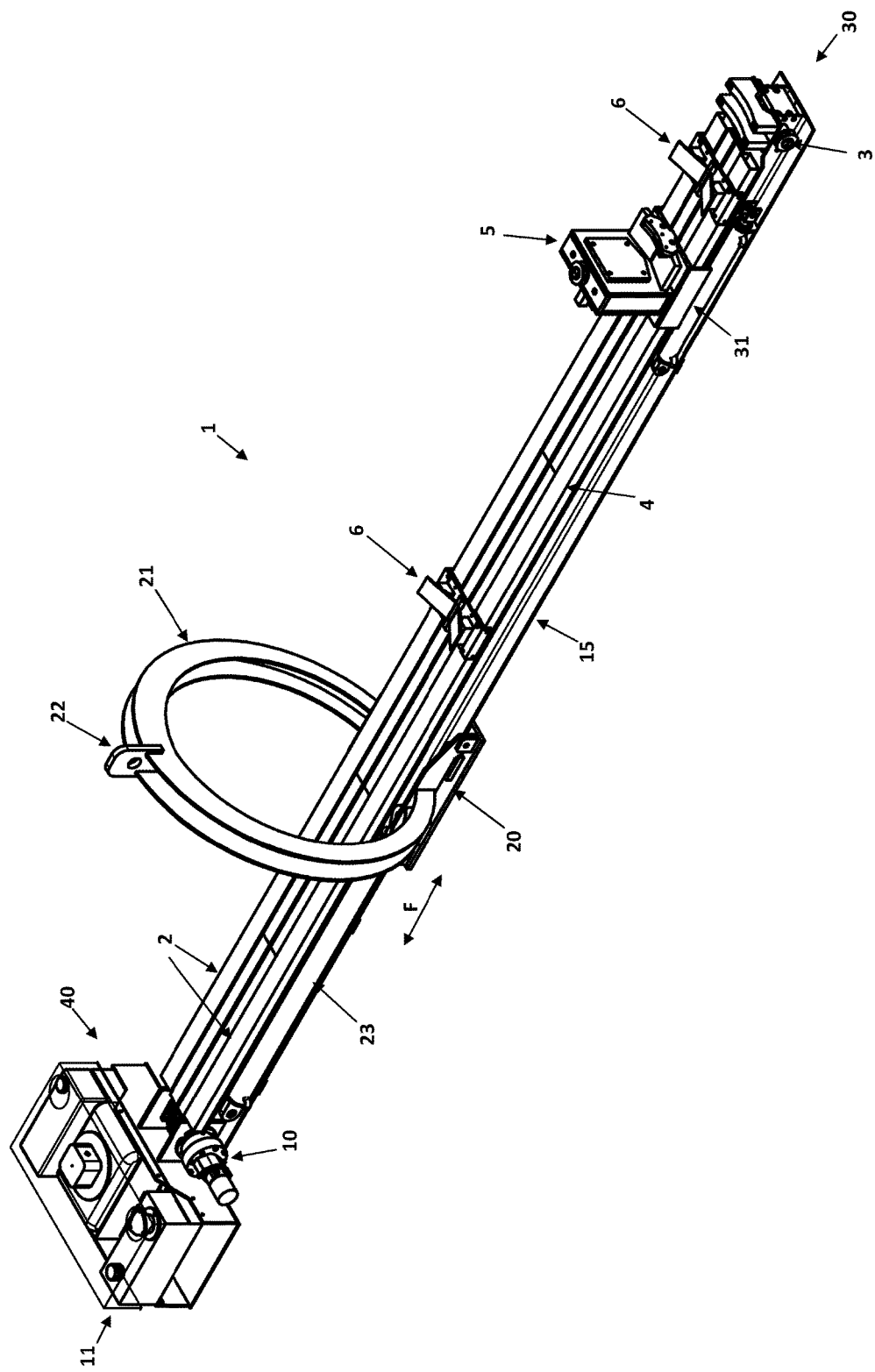

MACHINE FOR AERIAL HANDLING OF LOADS

FIELD OF THE INVENTION

The present invention relates to a machine for handling suspended loads, particularly loads having elongated dimensions, such as tube bundles, or the like.

For example, typical fields of application of the present invention are those related to the assembly/disassembly of ovens radiant piping, heat exchangers bundles handling, the preparation for the 'on-site' welding of contiguous and successive portions of a pipeline, etc.

BACKGROUND

The machine that will be described below, is intended to operate in an industrial environment, preferably in the field of handling circular shaped metal loads, less than one meter in diameter, of variable length and weight less than eight tons.

In fact, for larger diameters and flow rates, operationally complex and cumbersome (from a logistical point of view) equipment exist, while for reduced size and loads, unstructured systems are normally used, that is mobile scaffolding, tirfort, hoists, manual slinging forklifts, with severe prejudice the security of the operations.

DE19614366 discloses a machine for the aerial handling of a load comprising a slide, means for the aerial suspension and means for coupling and dragging the load on the slide.

SUMMARY OF THE INVENTION

Is therefore a purpose of the present invention to solve the to date unsolved problems in the prior art, providing a machine that allows an easy handling of this type of loads and, above all, in complete safety for the operators. This is achieved through a machine as defined in claim 1. Further features of the present invention are defined in the dependent claims.

The present invention, overcoming the problems of the known art, involves numerous and evident advantages.

In particular, the present invention allows to simplify and automate as much as possible, each handling operation of this type of loads (long loads) with a reduced number of operators and in absolute safety.

Other advantages, together with the features and modes of operation of the present invention, will be apparent from the following detailed description of its preferred embodiments, presented by way of example and not for limiting purposes.

To this end will be made reference to the FIGURES of the accompanying drawings, in which FIG. 1 is a schematic view of a machine according to the present invention.

DETAILED DESCRIPTION OF EMBODIMENTS OF THE INVENTION

With reference to FIG. 1, a machine according to the present invention comprises a first bearing slide 15 and means for coupling and dragging 3, 4, 5, 6, 10 a load on the slide 15.

The whole machine is designed to operate in suspension, and then hung on a lifting system (crane or similar). To this end, the machine 1 comprises means for the aerial suspension 20, 21, 22.

Operating for example on a furnace for the extraction of a tube, with a diameter varying between 3 and 6 inches (corresponding to 76.2-152.4 mm), one will have to position the machine at the provided height by means of a crane.

Advantageously, said means for the aerial suspension 20, 21, 22 comprises a support plate 20 for the slide carrier 15. The base plate 20 is slidably mounted below the bearing slide 15, which is then supported by the plate 20, which will have a suitable surface, dimensioned according to the size of the machine to be determined according to the type of loads to which the machine is intended for.

A support structure 21, integral with the support plate 20, may be provided. For example, as shown by way of example in the FIGURE, such a structure can have the form of a ring 21 by a size such as to allow, in its interior, the passage of the object to be handled.

The support structure 21 comprises, in turn, a suspension element 22, for the connection to the lifting system, such as a suspension ring 22.

Can be also advantageously provided for the presence of an actuator for the longitudinal movement of the support plate 20 along the bearing slide 15, so as to continuously balance the possible oscillations of the machine due to weight shifting during the load handling operations.

To this end it is possible to move longitudinally the suspension point of the slide, as indicated by the arrow F in the FIGURE, so as to maintain the slide itself, with continuity, in an horizontal equilibrium. The actuator that allows the movement of the plate 20 relative to the slide 15 can be, for example, a hydraulic piston 23 having an adequate stroke. Such piston 23 has the fixing element semi-fixed and positionable along the slide itself as a function of the length of the tube (or any other load) to be balanced, to allow for a wider degree of balancing.

According to one embodiment, the bearing slide 15 comprises a pair of beams 2 arranged side by side in the longitudinal direction of the machine. The beams are preferably steel made and of a suitable length with respect to the length of the load to be moved.

According to one embodiment, the means for coupling and dragging 3, 4, 5, 6, 10 comprises a movable head 5, slidably mounted on the bearing slide 15. A terminal of the load to be handled can be coupled to the movable head 5.

The means for coupling and dragging 3, 4, 5, 6, 10 further comprises a motor 10 which drives a transmission system 3, 4, adapted to transfer the motion of the motor 10 to the movable head 5 so as to allow its controlled sliding along the bearing slide 15, in the two directions.

For example, each beam 2 supports, on each end, a toothed wheel 3, between which a steel chain 4 is mounted, the lower branches of the chain pass into the pair of beams and the upper branches pass on the outer faces of the pair of beams. The upper branches of the chain 4 are connected to the movable head 5. One of the two toothed wheels 3 has its axis keyed to the motor 10, for example a hydraulic motor, having a reversible rotation direction, and being capable of generating the drive force (or thrust) required to move.

Advantageously, the movable head 5 can be arranged in such a way that it can be adjusted in height relative to the plane of the bearing slide 15. In this case, the means for coupling and dragging 3, 4, 5, 6, 10 also comprises an actuator for moving in height the movable head 5. Such an actuator may advantageously be an additional hydraulic piston. Such a mechanism to adjust the height allows a correct vertical positioning of the machine, and in particular of the movable head 5, in front of the load to be handled.

In correspondence of one end of the machine, that placed in front of the load to be taken and moved (generically indicated with 30 in the FIGURE), means for blocking the bearing slide 15 on an external structure from which to pick up or drop off a loading may be provided.

For example, such means may comprise hooks for the sling (or rope, or chain), which serves to block the machine to the structure on which it operates, and a hydraulic piston 31 (with the necessary countershafts), for tensioning of the sling itself.

At the opposite end of the slide 15, generally indicated as 40 in the FIGURE, a power and propulsion group 11 can advantageously be provided.

In particular, the group 11 may include: a combustion (or electric or pneumatic) engine, the pump of the hydraulic oil, the diesel fuel tank, hydraulic oil (or compressed air) tank, the distribution valves oil, the electric battery. The motor start is preferably electric driven with a low voltage remote control.

Then, operationally, for example in the case of picking and handling of a load, the machine can be hooked to a lifting system and placed with the end 30 at the load to be lifted.

The slide can then be blocked on the structure from which the load is to be taken. The load may be coupled to the movable head which in turn will have been adjusted in height for greater precision.

At this point, by actuating the motor 10, the movable head can be driven along the slide and the load with it. Load supporting and stabilization elements 6 may be advantageously provided along the slide 15.

During the towing operation of the load on the slide, the longitudinal position of the support plate 20 may be continuously adjusted so as to always maintain an optimal balance.

Once loaded, the slide can be detached from the external structure and the load being handled according to the needs, for example, led to the ground. Once the load is returned to the ground (pipe, bundle or other) will be quick and safe to perform the following processing actions.

The present invention has hereto been described with reference to its preferred embodiments. It is to be understood that each of the technical solutions implemented in the preferred embodiments here described by way of example, may advantageously be differently combined therebetween, to form other embodiments afferent to the same inventive core and all however falling within of scope of protection of the below claims.

The invention claimed is:

1. A machine for the aerial handling of a load, comprising:
   a bearing slide;
   an aerial suspension device slidably mounted on the bearing slide, said aerial suspension device including a support plate slidably mounted below said bearing slide for supporting said bearing slide, a support structure formed integral with the support plate and having an interior allowing a passage of said load, and a suspension element for suspending the machine to a lifting device;
   a coupling and dragging device for coupling and dragging said load on said bearing slide;
   an actuator for a longitudinal movement of said support plate along said bearing slide, so as to continuously balance possible oscillations due to weight shifting during load handling operations; and
   load supporting and stabilizing elements provided along said bearing slide.

2. The machine according to claim 1, wherein said bearing slide comprises a pair of side by side beams.

3. The machine according to claim 1, wherein said coupling and dragging device comprises a movable head, slidably mounted on said bearing slide.

4. The machine according to claim 3, wherein said coupling and dragging device further comprises a transmission system and a motor for actuating said transmission system for transferring a motion to said movable head so as to allow a controlled sliding of said movable head along said bearing slide in both directions.

5. The machine according to claim 4, wherein said transmission system comprises at least one pair of toothed wheels and a drive chain.

6. The machine according to claim 3, wherein said movable head is adjustable in height relative to a plane of said bearing slide.

7. The machine according to claim 1, wherein said actuator is hydraulic.

8. The machine according to claim 1, further comprising a blocking device for blocking one end of the bearing slide on an external structure from which to pick up or drop off the load.

9. The machine according to claim 1, further comprising a power and propulsion device.

10. The machine according to claim 9, wherein said power and propulsion device comprises:
    a motor, a hydraulic propulsion system and an electrical power supply system.

* * * * *